April 29, 1952 K. SONDEREGGER 2,595,175
AIR-COOLED INTERNAL-COMBUSTION ENGINE WITH AIR FILTER
Filed Nov. 21, 1950
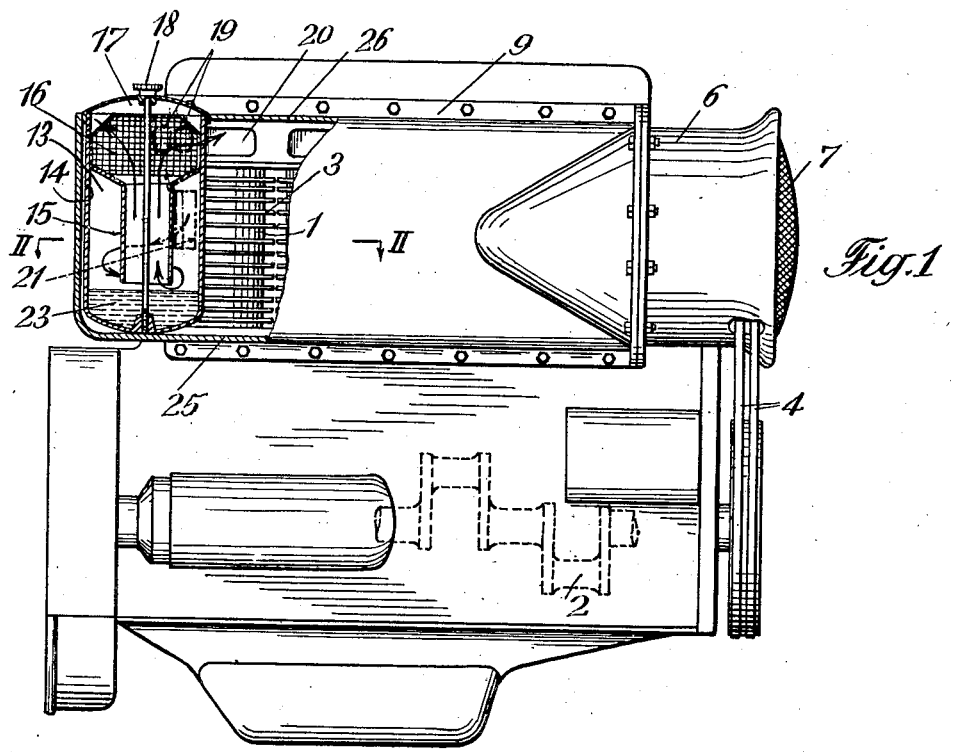
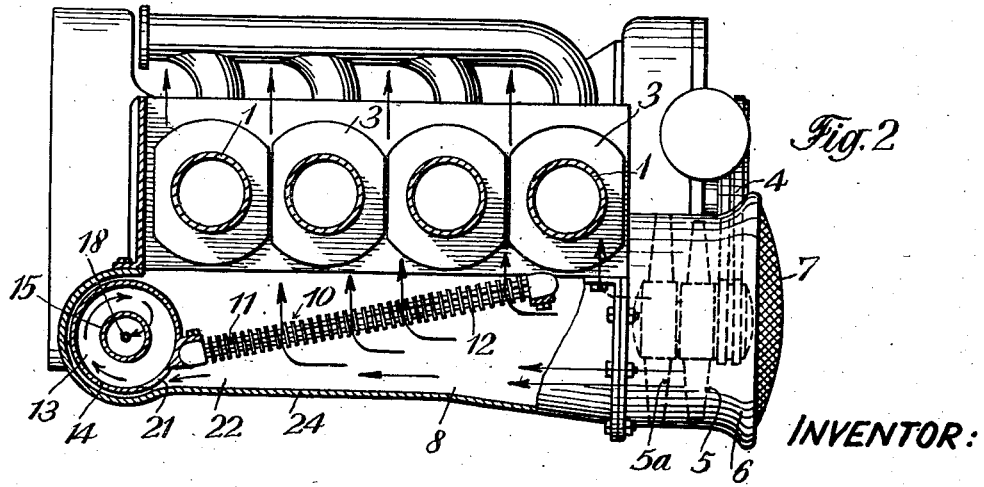
INVENTOR:
Konrad Sonderegger Patented Apr. 29, 1952

2,595,175

UNITED STATES PATENT OFFICE 2,595,175

AIR-COOLED INTERNAL-COMBUSTION ENGINE WITH AIR FILTER

Konrad Sonderegger, Winterthur, Switzerland, assignor to Schweizerische Lokomotiv- und Maschinenfabrik, Winterthur, Switzerland Application November 21, 1950, Serial No. 196,744
In Switzerland November 24, 1949

6 Claims. (Cl. 123—41.48)

1

In air-cooled internal combustion engines it is known to tap the combustion air from the cooling air flowing through an air duct from the fan to the cylinder cooling fins. The air pressure increase produced by the fan is transmitted also to the combustion air, at least as far as the static component of said increase is concerned, and thus is instrumental for a slight increase in the motor output, due above all to the feasibility of blowing off a portion of the hot residual gases at scavenging dead center and at the moment when inlet and outlet valve are simultaneously open.

When an air filter is disposed upstream of the suction manifold, the pressure increase applied to the combustion air may no longer be sufficient to overcome the filter resistance and to supply air under excess pressure to the motor cylinders, so that there may arise a subpressure in the suction manifold, depending on the type of filter used.

In order to obviate such difficulty, my present invention contemplates to also utilize as much as possible the energy of flow, i. e. the dynamic portion of the total energy produced by the fan. This is rendered possible by so adapting the airduct portion disposed immediately upstream of the air-filter entrance, to the shape of the air-filter entrance-opening as to form a continuous transition to the guide-way provided in the air filter.

Among the types of airfilters known in the art, the cyclone type is best suited for such purpose. The air to be cleaned circulates in a cyclone-type filter at very high velocity and the dust particles on account of the high centrifugal force are thrown against the filter wall whence they drop into a dust collector. The cyclone filter is known to be very effective, but causes a considerable pressure drop in the motor suction manifold, since the air in the filter has to be highly accelerated. Since in the arrangement according to my present invention a high-speed air current is already available, a cyclone filter can be used in the present case without loss of pressure in the cylinders.

One form of my present invention is shown in the accompanying drawing, in which

Fig. 1 is an elevation, partly in section, and

Fig. 2 a plan view partly in section on line II—II of Fig. 1.

The air-cooled four-stroke internal combustion engine shown comprises four separate vertical cylinders 1 of which the pistons drive the crankshaft 2. The cylinders are provided with horizontal cooling fins 3. A cooling-air fan comprising a blade wheel 5 driven by a V-belt 4, guide vanes 5a, and an air intake 6 provided with a coarse-mesh sieve 7, is mounted laterally of the motor forward end and substantially at the level of the cylinders. To the rear of the fan there is an air duct 8 which is flanged to the air intake 6 and the cylinder cowl 9. An oil cooler 10 is disposed in the air duct 8 at an acute angle with respect to the line of cylinders, and comprises a plurality of horizontal tubes 11 and a plurality of cooling fins 12 disposed transversely thereof. The fins 12 on one hand are instrumental for conducting the stream of cooling air in uniform distribution and with a minimum of eddies to the cylinder cooling fins 3, as shown by arrows in Fig. 2, and on the other hand this oil-cooler unit defines a subduct in duct 8, which subduct opens into the air filter 13 disposed at the rear end of cowl 9. The filter 13 is of the cyclone type and comprises a cylindrical jacket 14 having a closed bottom, a cylindrical inset 15, an oil separator 16, and a lid 17. The various filter elements are clamped together by means of a screw 18 and at the same time secured and located in the air duct. On slackening the screw 18, the filter may be removed in an upward direction. In the upper portion of filter jacket 14, openings 19 are provided which open into the suction ducts 20 of the cylinders 1.

In the arrangement described, the combustion air is tapped from the air duct 8 and flows through the jacket aperture 21 tangentially into the filter. In order that the combustion-air current enter the air filter with a minimum loss of energy, the air-duct portion 22 immediately upstream of aperture 21 is so adapted and connected to the latter as to provide a continuous and smooth transition into the filter passage. The arrangement further is such that the combustion-air branch of the total air current has to wash the outside walls 24—26 of the cowling in order to flow as cool as possible into the motor cylinders, which measure also contributes to the improvement in the motor output.

In the filter, the current of combustion air first circulates as cyclone about the filter axis, agitating the surface of the oil bath 23 and forming a mist of oil which leaves an oil film on the filter walls. On account of the great centrifugal forces arising in the cyclone, the major portion of the dust particles are thrown against the filter wall 14. The air flow then is sharply deflected about the lower end of the cylindrical inset 15 and, in a second phase, throws dust particles still present therein directly into the oil bath 23 of which the surface is near the inset 15. After the air current, having been cleaned of dust, has moved to the top of inset 15 and passed through the oil separator 16 which is made of wire netting, it flows from the filter through the apertures 19 into the suction ports 20 and into the motor cylinders 1, still containing a portion of its dynamic energy. The oil particles separated in the wire netting 16 flow back into the oil bath 23.

What I claim as new and desire to secure by Letters Patent, is:

1. In an air-cooled internal combustion engine, comprising a plurality of finned cylinders, a cylinder cowling, a power-driven fan flanged to said cowling and delivering cooling air, a cowling duct through which the latter flows to and between said cylinders, means for tapping combustion air from said duct, an air filter through which the combustion air flows, the filter being built into the cowling duct, and duct means through which the combustion air flows from the filter into the cylinders, the improvement defined by the provision of a transition duct intermediary of said tapping means and the filter inlet and shaped so as to afford a continuous smooth passage for the combustion air flowing into the filter with a view of minimizing entrance losses.

2. An air-cooled internal combustion engine as set out in claim 1, in which the filter is removable from the cowling duct without removing the cowling.

3. In an air-cooled internal combustion engine as set out in claim 1, an oil cooler disposed in said cowling duct so as to separate the air flow into a cooling air current and a combustion air current.

4. An air-cooled internal combustion engine as set out in claim 1, in which the said filter is of the cyclone type and comprises an oil bath in its lower portion, the combustion air being sharply deflected to pass over the surface of the oil bath.

5. An air-cooled internal combustion engine as set out in claim 4, in which the various filter components are held together by means of a common screw, and the filter unit is secured to the cowling duct with a view of permitting a rapid inspection of the filter.

6. In an air-cooled internal combustion engine comprising a plurality of finned cylinders, a cylinder cowling, a power-driven fan flanged to the latter and delivering cooling air, a cowling duct through which the latter flows to and between said cylinders, means for tapping combustion air from said duct, an air filter through which the combustion air flows, the filter being incorporated in the cowling duct, an oil cooler disposed in said cowling duct, and duct means through which the combustion air flows from the filter into the cylinders, the improvement defined by the provision of a transition duct intermediary of said tapping means and the filter inlet and shaped so as to afford a continuous smooth passage for the combustion air flowing into the filter with a view of minimizing entrance losses, disposing the said oil cooler in the cowling duct so as to separate the airflow into a cooling-air current and a combustion-air current, disposing the airfilter at the oilcooler rear end, and forming one wall of the said transition duct by the oilcooler.

KONRAD SONDEREGGER.

REFERENCES CITED

The following references are of record in the file of this patent:

UNITED STATES PATENTS

| Number | Name | Date |
|---|---|---|
| 1,254,861 | Smeeth | Jan. 29, 1918 |
| 1,347,043 | Justice et al. | July 20, 1920 |
| 1,691,593 | Tank et al. | Nov. 13, 1928 |
| 1,761,929 | McCuen | June 3, 1930 |
| 2,145,233 | Buck | Jan. 31, 1939 |
| 2,169,243 | Higbie | Aug. 15, 1939 |